March 17, 1964 — E. A. MOYANO — 3,125,400
RECORDING INSTRUMENT
Filed Aug. 10, 1961 — 3 Sheets-Sheet 3
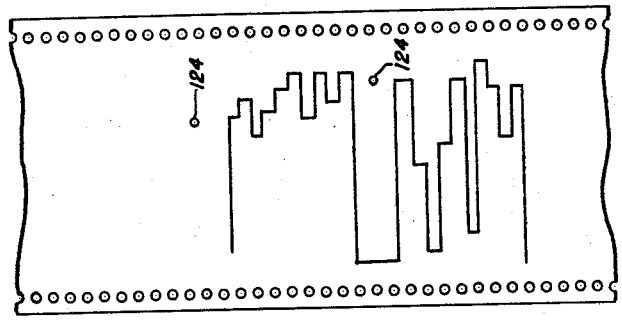
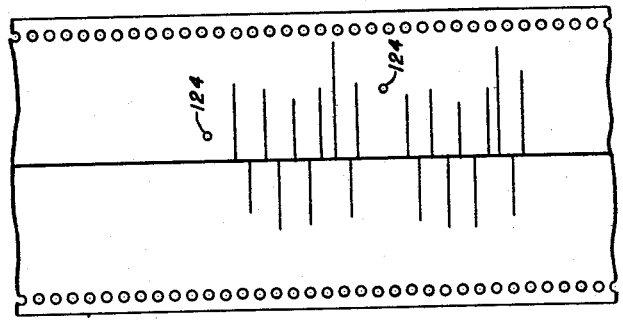
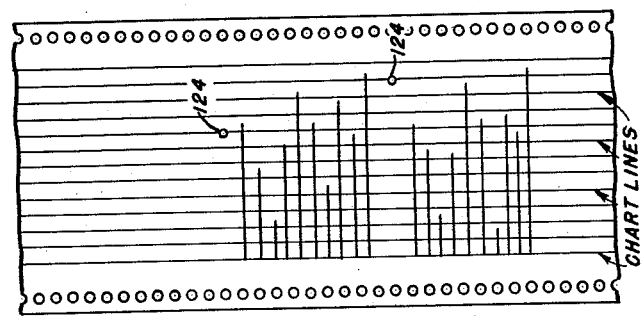
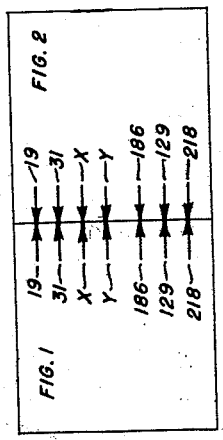
ERNESTO ALIAGA MOYANO
INVENTOR.

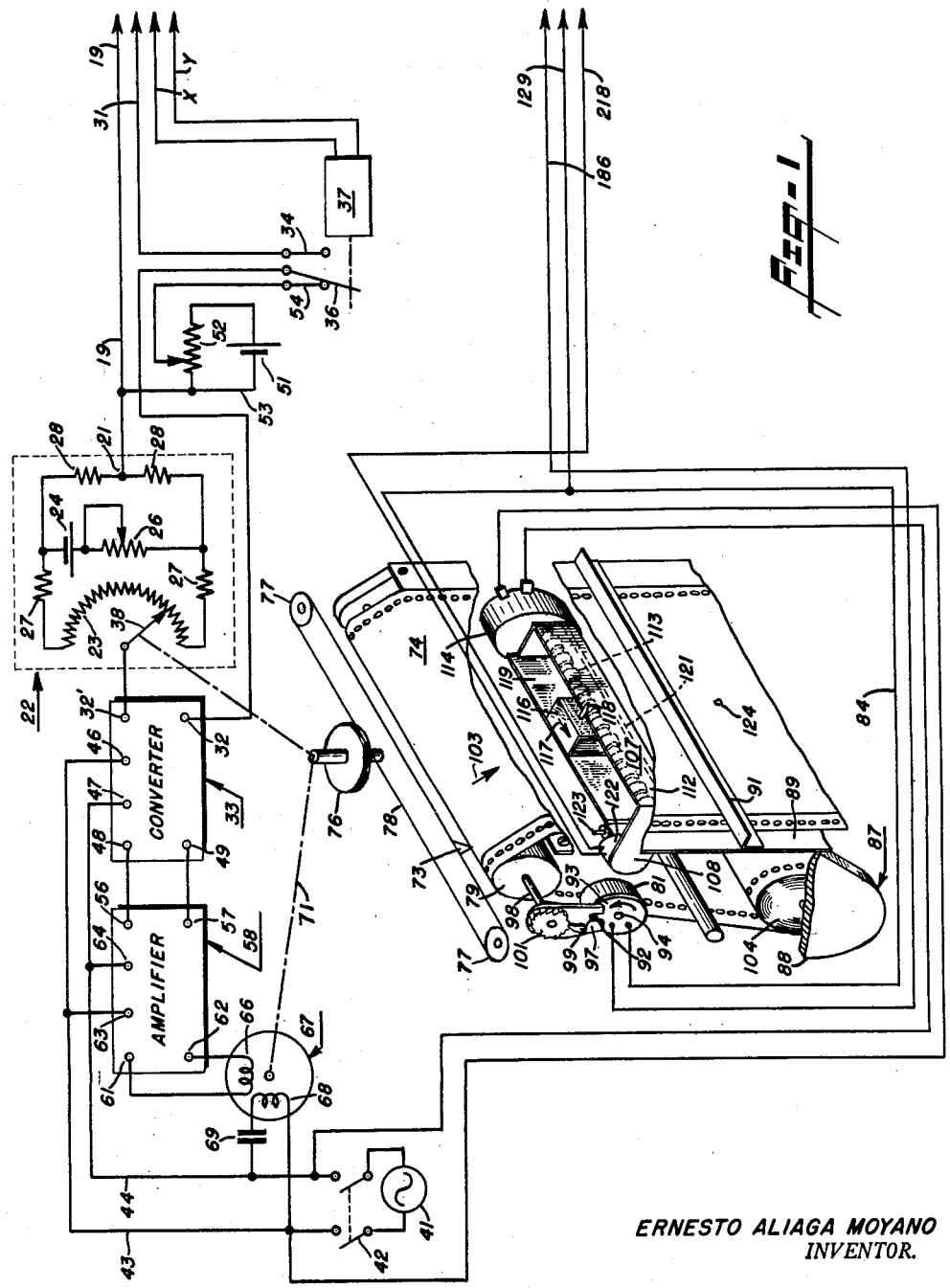

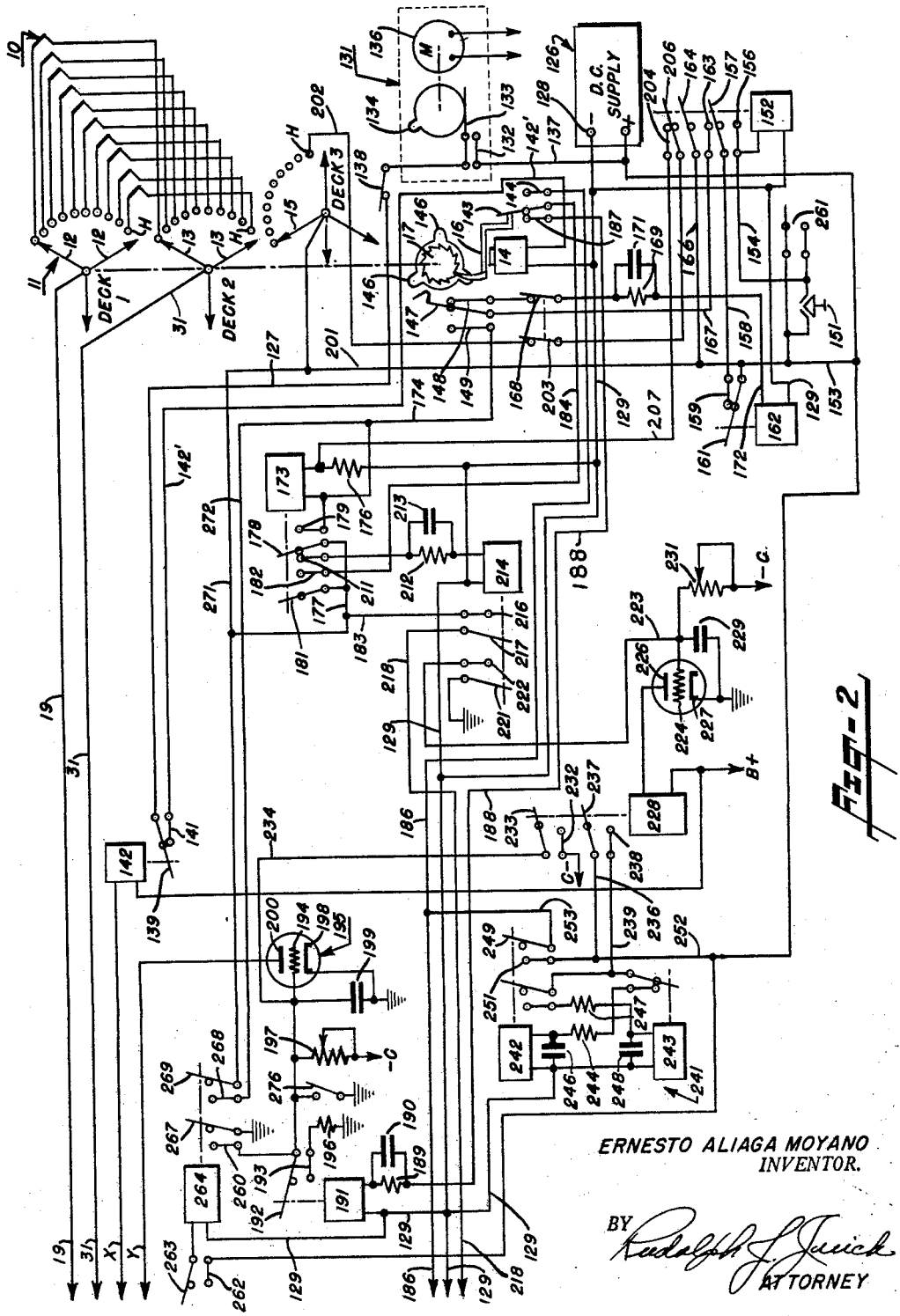

United States Patent Office 3,125,400
Patented Mar. 17, 1964

3,125,400
RECORDING INSTRUMENT
Ernesto Aliaga Moyano, New York, N.Y., assignor to Thermo Electric Co., Inc., Saddle Brook, N.J., a corporation of New Jersey
Filed Aug. 10, 1961, Ser. No. 130,561
4 Claims. (Cl. 346—34)

This invention relates to a recording instrument and more particularly to a strip chart type recording instrument in which the chart is intermittently driven.

In recording instruments of the type contemplated by my invention, a record of the value of a plurality of conditions is made upon a strip chart. The chart is moved intermittently and a pen, or stylus, is utilized to make a record of the conditions thereon; the recording element being moved laterally across the chart to a position corresponding to the value of the condition under measurement. A plurality of voltage sources, such as thermocouples, for example, are successively connected one at a time, to a single self-balancing network in the recording instrument. The pen, or stylus, remains in recording contact with the chart at all times, and is moved thereacross only when the intermittently driven chart is stationary.

One type of record which may be obtained with my novel recorder arrangement utilizing an intermittently driven chart may comprise a series of spaced straight lines, or bars, all of which originate at a predetermined reference level and each having a length dependent upon the value of the input voltage to the balancing network. By simply setting suitable switch means, the record may be made to comprise a continuous line forming steps, with the lateral height of the steps (rather than the length of a straight line, or bar) being dependent upon the value of the input voltage.

For a record comprising a series of straight lines, or bars, as first-mentioned above, the stylus starts from a zero or other predetermined reference level, travels laterally of the chart to a position wherein the balancing network is balanced, and returns along the same path to the said reference level; the chart being stopped during the time the stylus is moving. With the reference level input to the recorder, the stylus is stationary and the chart is moved a step. After stopping, a succeeding input is applied to the balancing network and the above-described stylus movement repeated for such input.

For a record of the profile of the multiple inputs, wherein the record comprises a plurality of steps, as mentioned above, the stylus, instead of returning to zero or other predetermined reference level after reaching each balanced condition, proceeds to the new balance point from the succeeding balance condition point; the chart being intermittently moved during the time the network is balanced.

In addition to the above-mentioned modes of operation, the recorder of my invention may be utilized to track a single input thereto. The chart frame employing the intermittent chart actuating mechanism is replaced by a chart frame having a continuously driven chart, and the recorder circuitry is conditioned to provide a single input thereto, for tracking the same.

An object of this invention is the provision of a multiple point recorder of the null balance type which includes a recording element in continuous recording engagement with a strip chart and movable laterally thereacross, means alternately advancing and stopping the chart, means successively connecting a plurality of inputs to be measured, one at a time, to the recorder during the time the chart is stopped, and means connecting an input of predetermined value to the recorder while the chart is advancing.

An object of this invention is the provision of a multiple point recorder of the null balance type having a recording element in continuous recording engagement with a strip chart, means sucessively connecting a plurality of inputs to be measured, one at a time, to the recorder, and means intermittently driving the chart.

These and other objects and advantages will become apparent from the following description when taken with the accompanying drawings. It will be understood, however, that the drawings are for purposes of illustration and are not to be construed as defining the scope or limits of the invention, reference being had for the latter purpose to the appended claims.

In the drawings wherein like reference characters denote like parts in the several views:

FIGURE 1 is a semi-diagrammatic view of a recorder mechanism embodying this invention and part of a schematic circuit diagram therefor;

FIGURE 2 is the remainder of the schematic circuit diagram used for the control of the recorder of FIGURE 1;

FIGURE 3 shows how FIGURES 1 and 2 should be disposed to form an operating recorder;

FIGURE 4 is a fragmentary view of a chart showing a trace comprising a plurality of spaced parallel lines, or bars;

FIGURE 5 is similar to FIGURE 4 only showing the traces originating from a reference level displaced from zero and showing all inputs normally adjusted for such reference level; and FIGURE 6 is similar to FIGURE 4 only showing a continuous trace forming steps.

Reference is first made to FIGURES 1 and 2 (to be oriented as shown in FIGURE 3) wherein there is shown a plurality of thermocuples 10 which may be located within a furnace, or furnaces (not shown) for the measurement of furnace temperature, for example. The thermocouple terinals are shown connected to individual fixed contacts of first and second decks of a stepping switch 11. The movable arms 12 and 13 of the switch 11 are rotatable by means of a stepping switch motor magnet 14 through a pawl 16 and ratchet 17 arrangement, whereby the rotatable switch arms are advanced one switch position each time the magnet 14 is energized; the energization circuit for the magnet 14 being described in detail hereinbelow.

The movable arms 12 of the switch deck No. 1 are connected through a lead wire 19 to one terminal 21 of a null-point potentiometer network 22. The potentiometer nework includes a circular slide wire 23 connected across a fixed voltage, such as a battery 24, through an adjustable resistor 26 and fixed resistors 27, 27. The lead wire 19 from one thermocouple terminal is connected through fixed resistors 28, 28 to the nework. A lead wire 31 from the movable arm 13 of the switch deck No. 2 is adapted for connection to one input terminal 32 of a converter 33 through fixed and movable contacts 34 and 36, respectively, of a relay 37, when the said relay 37 is in the energized condition. Thus, with the relay 37 energized, the thermocouple voltage connected through the stepping switch 11 is opposed to the potential drop across a variable portion of the slide wire 23, as determined by the position of a rotatable contact 38.

The potential unbalance between a thermocouple 10 and the voltage derived from the potentiometric network 22 (when the relay 37 is energized) is fed to the input terminals 32, 32' of the converter 33, which converter may be of any suitable type, such as a vibrator. A typical vibrator includes a movable contact which is actuated in opposite directions to alternately make and break electrical contact with a pair of spaced fixed contacts. Vibration of the movable contact is obtained by use of the source of alternating potential 41 connected through a switch 42 and lead wires 43 and 44 to terminals 46 and 47 in the vibrator. The vibrator opens and closes the series connected thermocouple and potentiometric network circuits at the frequency of the alternating source 41. By use of a suitably connected transformer, having a center-tapped primary winding in the vibrator circuit, the potential unbalance between the thermocouple and potentiometric network is converted to a pulsating potential at the vibrator output terminals 48 and 49. With the relay 37 in the illustrated deenergized condition, a potential source derived from a shunt-connected battery or potential source 51 and potentiometer 52 is substituted for a thermocouple 10; one end of the battery and potentiometer being directly connected through a lead wire 53 to the terminal 21 of the potentiometric network 22, while the movable arm of the potentiometer 52 is connected through a fixed contact 54 and the movable contact 36 to the converter input terminal 32. Thus, the setting of the potentiometer 52 determines the level of input to the recorder when the relay 37 is deenergized while the output from the thermocouple connected to the circuit through the switch 11 determines the input thereto while the relay 37 is energized.

The vibrator output terminals 48 and 49 are connected to the input terminals 56 and 57 of an amplifier 58, where the potential unbalance is amplified and appears at the amplifier output terminals 61 and 62. Power for the amplifier is supplied by the source 41, which is connected to the terminals 63 and 64 of the said amplifier. Any suitable amplifier circuitry may be used. The output terminals 61 and 62 of the amplifier 58 are connected to the control winding 66 of a two-phase, reversible, control motor 67. The reference winding 68, of the motor, is connected to the source of alternating potential 41 through a capacitor 69. The motor will thus be energized for rotation in one direction or the other, depending upon the phase of the current in the control winding 66 with respect to the current in the reference winding 68, which, in turn, will depend upon the direction of unbalance of the potentiometric circuit 22, as will be well understood by those skilled in the art. The motor 67 is connected through suitable linkage 71 to the rotatable contact 38 in the potentiometric network, and moves the contact in a direction to rebalance the potentiometric sysem.

The motor 67, in addition to driving the potentiometer slider 38, also serves to move a pen or stylus 73 across a chart 74, as by means of a drive pulley 76, pulleys 77, 77, and drive cable 78; the recording element being in contact with the chart at all times. The chart 74 is driven by a power driven roller, or drum 79 which is adapted for intermittent rotation by means of a rotary solenoid 81 connected thereto by linkage shown in detail in my copending patent application Serial Number 108,-818, filed May 9, 1961, and entitled Chart Drive Mechanism, to which application reference is made. It will be understood that the roller 79 is advanced a predetermined amount each time the solenoid 81 is energized, and then remains stationary until the solenoid 81 has been deenergized and again energized. The solenoid is provided with terminals to which lead wires are connected and through which wires the solenoid may be energized, as described hereinbelow. In FIGURE 1, a fragmentary portion of a chart frame, designated generally 87, is shown comprising a pair of end plates 88 (only one of which is shown) interconnected by a face plate 89. A tear-off bar 91 is secured to the plate 89 a spaced distance therefrom behind which the chart 74 passes.

The rotary solenoid 81 for drive actuation of the chart is spring biased to a normal position, illustrated in FIGURE 1, and returns to such position when deenergized following energization thereof. A crank pin 92 extends from a plate 93 secured to the end of a shaft 94 of the solenoid which pin is parallel with but spaced from the shaft axis. The pin 92 is disposed within a slot formed in an arm 97 that is pivotally mounted on a shaft 98 to which the drive roller 79 is secured. The arm 97 carries a resilient leaf spring pawl 99, which is in engagement with a ratchet wheel 101 fixedly secured to the shaft 98. When the solenoid 81 is energized, the plate 93, with the pin 92 attached thereto, is rotated counterclockwise. A counterclockwise rotation of the pin 92 about the solenoid axis provides a clockwise rotation of the arm 97 through the pin and slot connection. The clockwise rotation of the arm 97 is imparted to the chart drive drum shaft 98 through the pawl 99 and ratchet wheel 101 connection. The arm 97 is pivoted a sufficient distance to provide one step advance of the pawl and ratchet connection. It will be seen, then, that the chart 74 is advanced a predetermined amount in the direction of the arrow 103 each time the solenoid is energized. As mentioned above, complete details of the chart advance mechanism are shown in my copending patent application Serial Number 108,818.

The chart 74 is drawn off a supply roll 104 rotatably supported between the end walls 88 of the chart frame 87. In accordance with well known practice, the drive roller 79 is provided with a plurality of radially extending projections adjacent one edge thereof which project through apertures provided along the margin of the chart whereby driving engagement between the chart and drive roller is effected.

From the drive roller 79, the chart passes in front of an hour indicator device, designated generally 107, disposed behind the chart and above the tear-off bar 91. An hour indicator device suitable for use in the recorder of this invention is shown and described in detail in my co-pending patent application Serial Number 130,562, filed August 10, 1961, and entitled, Hour Indicating Device for Recording Instrument, which application is incorporated by reference herein.

Briefly, the indicator 107 comprises a generally U-shaped supporting frame 108 which is secured to the front wall 89 of the chart frame by means not shown. A lead screw 113 (shown in broken lines) is rotatably supported between the end walls of the frame 108 and is adapted to be driven continuously by a constant speed timing motor 114 suitably connected thereto. The lead screw 113, during rotation thereof, functions to drive a carriage 116 transversely of the chart in the direction of the arrow 117. The lead screw may be rotated at such a rate as to drive the carriage along a predetermined length of the screw in, say, a period of 24 hours. By proper setting of the carriage, then, it will be apparent that the position thereof transversely of the chart is an indication of the time. Means, not shown, may be employed to return the carriage substantially instantaneously from one end point of travel to the other after completion of each 24 hour period.

The carriage 116 carries a pointed pin 118 which is axially slidably movable; the pin being normally resiliently biased rearwardly by means not shown. A plate 119 is pivotally mounted on a rod 121 extending between the end walls of the frame 108, with the rear end of the pin 118 in engagement with the plate. A rotary solenoid 122 is mounted on the end wall of the frame 108 and is provided with an actuator pin 123 which engages the pivotally-mounted plate 119 and rotates the same in the direction of the pin 118 to move the pin in a forward direction upon energization of the solenoid. The pin thereby punctures the chart as shown at 124 to provide time indications thereon, it being apparent that the chart may include vertical lines marked in hours for this purpose.

The energization circuits for the switch motor magnet 14, the relay 37, and the rotary solenoids 93 and 122, for novel operation of the recorder as set forth above, will now be described. A direct current source of supply 126 (FIGURE 2) has a negative terminal connected by a common lead 129 to one side of the stepping switch motor magnet 14 and to most of the relays and solenoids in the recorder. Energization of the motor magnet 14 is under control of a timer switch 131 comprising a fixed contact 132 and movable contact 133 under control of a cam member 134 driven by a motor 136. The fixed contact 132 is connected through a lead wire 137 to the positive terminal of the supply source 126 while the movable contact 133 is connected through a switch 138, the lead 127, the movable and fixed relay contacts 139 and 141 of a power relay 142, and a lead wire 142' to one terminal of the power winding of the motor magnet 14; the other terminal of the power winding being connected to the common lead wire 129, as mentioned above. The contacts 139 and 141 are normally closed in the deenergized condition of the relay 142. With the switch 138 and relay contacts 139 and 141 closed, it will be apparent that the motor magnet 14 is energized each time the timer contacts 132 and 133 are closed by the rotating cam member 134. When the motor magnet is energized, normally open interrupter switch contacts 143 and 144 are closed, and the ratchet wheel 17 is advanced by the pawl 16 immediately upon deenergization thereof. In addition to rotating the movable contacts of the stepping switch 11, the motor magnet rotates a cam member, having three lobes 146, simultaneously therewith. These lobes serve to actuate periodically the movable contact 147 which cooperates with normally closed and open contacts 148 and 149, respectively. The contact 147 engages the normally open contact 149 when one of the cam members of the stepping switch actuates the said movable contact 147. The position of the stepping switch wherein the contacts 147 and 149 are closed is termed the "home" position in accordance with normal stepping switch terminology.

The typical operating cycle is started by momentary actuation of a normally open push button starting switch 151 to a closed condition. With the switch 151 momentarily closed, a power relay 152 is energized, the positive terminal of the voltage source 126 being connected through lead wire 153, the switch 151, and a lead wire 154 to one terminal of the relay control winding, while the other terminal of the control winding of the relay 152 is connected through the common lead wire 129 to the negative terminal of the voltage source. Energization of the relay 152 closes normally open contact 156 and movable contact 157 to electrically lock-in the relay through a lead wire 158, normally closed contact 159 and movable contact 161 of a relay 162 and the lead wire 153. At the same time, the normally open contact 163 and movable contact 164 (of relay 152) are closed whereby the positive terminal of the supply 126 is connected through a lead wire 166, the contacts 163 and 164, a lead wire 167, the contacts 147 and 148 (it being assumed that the stepping switch is in an off-home position, as illustrated) and a normally closed switch 168 to one side of an R-C combination comprising shunt connected resistor 169 and capacitor 171. The capacitor 171 is normally discharged, hence a charging current will flow therethrough and through a lead wire 172 to one terminal of the control winding of the relay 162; the other terminal thereof being connected to the negative supply terminal 128 through the common connection 129, as described above. The relay 162 thereby energizes, thereby opening the contacts 159 and 161 in the lock-in circuit for the relay 152. The above-described action occurs substantially immediately following closure of the switch 151, and although the switch 151 is closed only momentarily, it is held closed during the time the relay 162 is momentarily energized by the surge of current through the capacitor 171, whereby the relay 152 remains energized. The resistance 169 discharges the capacitor 171 and is of large enough value to limit the current flow therethrough to a sufficiently small value whereby the relay 162 deenergizes, and remains deenergized. The value of the resistor 169 is, however, low enough to provide a short time constant in combination with the capacitor 171 whereby the capacitor 171 discharges with sufficient rapidity to provide only momentary energization of the relay 162.

The stepping switch 11 continues to operate with every closure of the timer switch contacts 132 and 133, without, however, advancing the chart or without effecting a recording operation. When the stepping switch reaches home position, i.e., when the movable contacts of the switch 11 engage the fixed contacts designated H and the movable spring contact 147 closes with the fixed contact 149, a relay 173 is energized; one terminal of the control winding of the relay 173 being traced to the positive terminal of the D.-C. voltage supply through a lead wire 174, the now closed contacts 149 and 147 of the stepping switch, the lead wire 167, the closed contacts 163 and 164 of the relay 152, and the lead wire 166. The other terminal of the control winding of the relay 173 is connected through a resistor 176 to the common negative connection lead 129. The relay 173 is thereby energized and an electrical lock-in circuit is completed through the lead wire 177 connected to the positive terminal of the supply 126, and the movable and normally open relay contacts 178 and 179, respectively. Now, when the stepping switch proceeds to point #1, i.e., one step off the home position) the contact 148 will close with the contact 147, and the charging current path of the capacitor 171 will again be completed; the capacitor 171 having discharged in the meantime through the resistor 169. This surge of charging current, as described above, flows through the control winding of the relay 162 to momentarily energize the same. Upon energization of the relay 162, the holding circuit for the relay 152 is open, and since the switch 151 is open, the relay 152 is deenergized.

Energization of the relay 173 also results in the closure of the normally open contacts 181 and 182 whereupon the positive terminal of the D.-C. supply is connected through a lead wire 183, the now-closed contacts 181 and 182, and a lead wire 184 to the movable contact 143 of the interrupter spring contacts, which movable contact is actuated each time the stepping switch motor magnet 14 is energized. Thus, at each step of the stepping switch, when the contacts 143 and 144 are closed, the posiitve terminal of the D.-C. source is connected through a lead wire 186 to the chart drive solenoid 81 thereby energizing the same; the other terminal of the rotary solenoid 81 being connected by the lead 84 to the common negative connection 129. Thus, it will be seen that every time the stepping switch advances (after once having gone through home position) the rotary chart drive solenoid 81 is energized whereby the chart is advanced a predetermined distance in the direction of the arrow 103.

With the interrupter switch contact 143 in engagement with the normally closed contact 187 thereof, connection of the positive potential at the contact 143 is made through a lead wire 188 and a shunt connected R-C network comprising a resistor 189 and capacitor 190 to one terminal of the control winding of a relay 191. The other control winding terminal is connected to the lead wire 129 to the negative terminal of the D.-C. supply. With the capacitor 190 initially discharged through the resistor 189, a surge of current will flow through the relay control winding upon closure of the contacts 143 and 187 whereby the relay 191 is momentarily energized. (It will be understood that the shunt-connected resistor 189 and capacitor 190 perform a function similar to the function of the resistor 169 and capacitor 171 combination in the energization circuit of the relay 162). Momentary energization of the relay 191 closes the normally open relay contacts 192 and 193 thereby grounding the control grid 194 of a triode tube 195 through a relatively low value resistor 196 to cause the tube 195 to conduct. Normally, the tube 195 is cut off by connection of the grid 194 to a negative supply, designated −C, through a potentiometer 197; the tube cathode 198 being directly connected to a common ground. A capacitor 199 is connected between the control grid 194 and the common ground. With the tube 195 cut off (the relay 191 deenergized) no plate current flows, and the relay 37 (FIGURE 1) having the control winding in the plate circuit remains deenergized. It will be seen that the anode 200 of the tube 195 is connected through the control windings of the relays 37 and 142, in series, to a positive source of supply designated +B. Closure of the relay contacts 192 and 193 also results in the discharging of the capacitor 199 through the relatively small resistor 196, and as soon as the contacts 192 and 193 reopen, the capacitor 199 begins recharging through the potentiometer 197. The R-C time constant of the potentiometer 197 and capacitor 199 determines the time during which the tube 195 will conduct upon each operation of the relay 191; the said tube conducting for a time after the relay contacts are reopened until the charge on the capacitor 199 becomes sufficiently large to cut off the tube.

As described in detail above, energization of the relay 37 transfers the measuring circuit input of the recorder from the constant reference potential 51 to the thermocouple input through the switch 11. The R-C time constant of the potentiometer 197 and capacitor 199 is adjusted by the potentiometer to permit the potentiometric network 22 to reach a balance before the relay 37 is deenergized and the circuit is switched back to the reference potential. The potentiometer network is overdamped to assure that the recorder stylus 73 does not overshoot when balancing. As mentioned above, when the relay 37 is deenergized, the stylus 73 returns to the reference level as set by the position of the potentiometer 52; the relay 37 remaining deenergized until the cycle is initiated again by the closure of the contacts 132 and 133 of the timing switch 131. When the motor magnet is deenergized, the contacts 143 and 144 of the interrupter switch close causing the energization of the chart drive solenoid to thereby advance the chart one step. It will be noted that the energization circuit for the motor magnet includes the contacts 139 and 141 of the relay 142, which relay is energized during the connection of a thermocouple to the recorder input, whereby the motor magnet cannot be energized to advance the chart and the stepping switch 11 during the time of a recording operation.

The cyclic operation of the recorder continues until all of the thermocouples have all been scanned and a record of their inputs made on the chart; the length of the bar traces of the individual inputs being an indication of magnitude of the inputs. When the movable arms of the stepping switch 11 return to a home position, the contact 15 of deck No. 3 thereof serves to connect, through the H contact, the positive terminal of the voltage supply 126 to the one terminal of the relay 173 to short-circuit the control winding thereof thereby deenergizing the relay. With the relay 173 deenergized, the contacts 181 and 182 thereof open to remove the positive potential from the interrupter switch contact 143 to prevent energization of the chart drive solenoid 81 and the consequent stepping of the chart, as the motor magnet 14 continues to be energized periodically. The means for deenergizing the relay 173 when the stepping switch returns to home position includes a lead wire 201 from the positive terminal of the D.-C. supply to the movable arm 15 of Deck No. 3 of the switch 11, contact H, lead wire 202, a normally closed switch 203, normally closed contacts 204 and 206 of the relay 152 and a lead wire 207 to the control winding of the relay 173. With the positive potential applied to both terminals of the control winding of the relay 173, the relay thereby is deenergized. The entire voltage of the power supply is developed across the resistor 176 during this time. With the relays 152, 162 and 173 deenergized, continued operation of the stepping switch does not result in further recording operation until the push button switch 151 is again momentarily closed. This stoppage provides an indication of the recording operations each scanning cycle, that is, that such a cycle has been completed.

At the end of the recording cycle, when the stepping switch returns to home position, the hour indicator solenoid 122 is energized to provide a time indication on the chart by the puncturing of the chart with the pointed pin 118. The means for energization of the solenoid 122 will now be described. When the relay 173 is initially deenergized, the lead wire 177, which is connected to the positive terminal of the voltage supply 126, is connected through the movable contact 178 and fixed contact 211 of the relay 173, and a shunt connected R-C circuit comprising a resistor 212 and capacitor 213 to one terminal of the control winding of a time indicating relay 214; the other terminal of the control winding being connected to the common lead 129. Since the capacitor 213 is initially discharged, through the resistor 212, a surge of current will flow therethrough momentarily energizing the relay 214. On further application of voltage across the relay control winding through the shunt connected resistor 212 and capacitor 213 the capacitor will charge and a potential will be developed thereacross which is of sufficient magnitude to reduce the relay control winding potential sufficiently to result in the deenergization of the relay 214. Hence, as with the relays 162 and 181, only momentary energization of the relay 214 is effected upon application of a potential thereto through the associated R-C network.

Upon energization of the relay 214, the connection of the positive terminal of the D.-C. supply through the lead wire 183, contacts 216 and 217 of the relay 214, and a lead wire 218, to one terminal of the solenoid 122 is completed; the other terminal of the solenoid being connected to the common lead 129. As described above, when the solenoid 122 is energized, the pin 118 punctures the chart thereby providing an indication of the time at which the thermocouples were scanned and the record of the inputs was made on the chart. It will be understood that any suitable type clock printing mechanism may be employed for time indication means; the invention not being limited to the chart puncturing device illustrated.

Momentary energization of the relay 214 also closes the relay contacts 221 and 222, the contact 221 being directly connected to a ground potential. The ground potential is carried through the contacts 221 and 222, and a lead wire 223 to the control grid 224 of a triode tube 226 having a cathode 227 connected to the common ground. Hence, when the grid is grounded, the tube conducts, with the plate current thereof flowing through the control winding of a relay 228 energizing the same; the other terminal of the relay control winding being connected to the +B supply. A capacitor 229 is connected between the grid 224 and common ground connection, while a potentiometer 231 connects the grid to a negative supply, designated —C. With the contacts 221 and 222 open, the capacitor 229 charges through the potentiometer 231 to cut off the tube 226 when the charge reaches a predetermined value. When the contacts 221 and 222 make, upon energization of the relay 214, the capacitor 229 is discharged and the tube 226 conducts. As in the case of the tube 195, the period of time which the relay 228 is energized is dependent upon the rate at which the capacitor 229 charges through the potentiometer 231 after reopening of the relay contacts 221 and 222.

When the relay 228 is energized, a negative potential, designated —C, is connected through closed contacts 232 and 233 and a lead wire 234 to the grid 194 of the tube 195 to insure the continued cut off condition of the tube 195, for reasons which will become apparent hereinbelow.

A lead wire 236 from the positive terminal of the D.-C. source 126 is connected to the movable contact 237 of the relay 228, which contact engages the contact 238 of the relay. The positive potential is thereby applied through a lead wire 239 to a relay flip-flop circuit 241 of conventional design. The flip-flop includes relays 242 and 243, which are alternately actuated and deenergized at a frequency dependent upon the time constant of the resistor 244, capacitor 246, resistor 247 and capacitor 248.

One of the relays (242 in the illustrated example) includes a second set of contacts 249 and 251, one of which contacts 251 is connected through lead wire 252 to the positive terminal of the D.-C. supply 126. Every time the contacts 249 and 251 make, the positive potential is applied through such contacts and a lead wire 253 to the chart drive solenoid 81 for stepping the chart. Since the flip-flop relays may draw a substantial current, which could adversely effect the supply potentials, and possibly result in the conduction of the tube 195, the grid 194 of the tube 195 is connected to the —C source through the relay contacts 232 and 233, as described above, during the flip-flop operation as a safety precaution against inadvertent conduction of the tube 195 and consequent operation of the relay 37. The time constant of the capacitor 229 and potentiometer 231 is adjusted to permit flip-flop operation for sufficient time to advance the chart, step by step, a sufficient distance after each scanning cycle of operation to a point wherein the record is positioned below the tear off bar 91 whereby the chart may be torn off with the record of the complete scanning cycle thereon.

A brief summary of the operation of the recorder when the operation is initiated by momentary manual actuation of the push-button switch 151 follows. Before the recording operation, the recorder is placed in a standby condition by application of the various potential sources thereto. The chart 74 is stationary and the hour indicator motor 136 is energized to drive the carriage 116 supporting the pin 118 transversely of the chart. The timer motor 136 is energized for periodic operation of the timer switch and actuation of the stepping switch motor margnet 14 whereby the switch is being continuously stepped. If the switch 151 is closed when the stepping switch is off home position, the stepping continues without recording action until the switch reaches home position. Thereafter, for each step of the switch, the recording stylus 73 moves across the chart from the reference point a distance dependent upon the value of the input potential from the particular thermocouple connected in the circuit. Alternately, after the recording member 73 returns to the set point (as determined by the position of the potentiometer 52) the solenoid 81 is energized to advance the chart 74 one step.

The alternate step chart advance and lateral movement of the recording member 73 across the chart continues until all the points on the stepping switch have been scanned and the switch returns to a home position. The hour indicator solenoid 122 is then energized to actuate the pin 118 to puncture the chart and provide a time record thereon of the time at which the inputs were scanned. The flip-flop 241 is then enrgized to produce a rapid stepping of the chart; the flip-flop remaining in operation sufficiently long to advance the record below the tear off bar 91. The chart advance mechanism then ceases and the circuit returns to a standby condition awaiting the start of a new scanning cycle. A fragmentary portion of a chart produced under such operating conditions is illustrated in FIGURE 4.

Under some circumstances, it may be desired that only measured potentials which deviate from normal be easily noted, the absolute value of such potential being of less significance. The thermocouples 10 could, for example, be connected through individual voltage divider networks to the recorder input, with such networks set to provide a single predetermined normal output. The potentiometer 52 may then be set for such predetermined normal level. If, then, the thermocouple outputs are at the desired level, there is no departure of the recording stylus from the set point upon recording operation. Obviously, in practice, the set point and thermo-couple outputs through the voltage dividers will vary sufficiently to provide movement of the recording elment along the chart. Such a record is indicated in FIGURE 5 of the drawings which is similar to FIGURE 4. It will be seen that deviations from the set point (the set point being the vertical straight line adjacent the center of the chart) are readily noted, as well as the direction of the deviation.

If the recorder is intended for use as a data logging instrument, the switch 151, or any other switch in parallel therewith, such as switch 261, may be periodically closed, as by a timer motor, say, every hour, whereby the inputs are scanned and recorded each hour.

The instrument is also readily adapted for recording of conditions only when an alarm condition prevails. Monitor alarm relay contacts 262 and 263 are shown, which contacts are normally open, but which are closed when the scanned point exhibits an alarm condition. The one contact 262 is connected to the positive terminal of the D.-C. supply 126, with the other contact 263 connected to one terminal of the control winding of a relay 264. The other relay control winding terminal is connected to the common lead wire 129. Thus, when the contacts 262 and 263 are closed (upon operation of suitable apparatus connected to the thermocouple inputs and closing the contacts under alarm conditions) the relay 264 is energized closing normally open contacts 260 and 267, and 268 and 269. The closing of contacts 260 and 267 grounds the grid of the tube 195 resulting in the conduction thereof and energization of the relay 37 thereby connecting the point producing the alarm condition to the recorder input. Closure of the second set of contacts 268 and 269 results in the energization of the relay 173 through lead wires 271 and 272. As described in detail above, when the contacts 181 and 182 of the relay 173 are closed, the movable contact 143 of the interrupter spring contacts is energized. The chart 74 is stepped and recording operations are thereby effected in the manner described above, until the stepping switch reaches home position, when the recording again stops. The point producing the alarm condition is ascertained by counting back from the last-recorded trace to the trace producing the alarm condition.

A further mode of operation is illustrated in FIGURE 6 of the drawings wherein there is shown a fragmentary portion of a chart upon which a single trace in the form of steps is shown, the lateral distance of the steps from one edge of the chart being an indication of the value of the condition under measurement. Such a trace is obtained by the closure of a switch 276 which grounds the grid 194 of the tube 195 placing the same in a conducting state to thereby enregize the relay 37 for closure of the relay contacts 34 and 36 and connection of the thermocouple outputs to the recorder input. Hence, with the switch 276 closed, the input to the recorder comprises the thermocouple outputs as sequentially connected thereto. The switches 168 and 203 are opened to prevent the automatic stopping of the recording operation at the end of each scanning cycle. (The switches 168 and 203 may be ganged together, as illustrated in broken lines, if desired.) At the home position of the stepping switch, the thermocouple output is removed from the recorder input whereby such step is easily identified on the chart for identification of all the other steps.

In addition to the above-described modes of operation, the recorder of my invention is readily adapted for operation as a single point strip chart recorder suitable for tracking a single point. For single point operation, the illustrated chart frame 87, more fully discussed in my copending application, Serial No. 108,818, supra, is replaced by one in which the chart is driven at a constant speed, such arrangement being of well known conventional design and including different gearing for a choice of chart speeds. Also, the switch 138 is opened to prevent the stepping of the stepping switch, and the switch 276 is closed to energize the relay 37. It will be readily apparent that only a single input from a single thermocouple is applied to the recorder input, with the recorder chart operating at a continuous speed. Electrical connection may be made through suitable plugs on the chart frame for automatic connection and disconnection as the chart frame is placed into and removed from position on the recorder.

Having now described my invention in detail in accordance with the requirements of the patent statutes, various changes and modifications will suggest themselves to those skilled in this art. It is intended that such changes and modifications shall fall within the spirit and scope of the invention as recited in the following claims.

I claim:

1. In a multiple point strip chart recorder of the null balance type, means connecting a plurality of input sources, one at a time, to the recorder input, means alternately connecting a source of reference potential and successive ones of a plurality of input potential sources to the input of the recorder, a recording element in continuous recording engagement with the chart, means intermittently advancing the chart past the recording element only during the time the reference potential source is connected to the recorder input, a stepping switch which is continually energized for actuation of the means connecting the plurality of input sources, one at a time, to the recorder input, means under control of the said stepping switch for initiating recording operation of the recorder at a predetermined position of the said stepping switch, and means under control of the stepping switch for terminating the recording operation when the input sources have been scanned.

2. The invention as recited in claim 1 including means providing an indication of the recording operations of each scanning cycle.

3. The invention as recited in claim 1 including means advancing the chart by a plurality of successive steps after each recording cycle of operation.

4. In a multiple point strip chart recorder of the null balance type, a recording element in continuous recording engagement with the chart, means successively connecting a plurality of input sources, one at a time, to the recorder input, means connecting a source of reference potential to the recorder input alternately with the connection thereto of said input sources, means intermittently driving said chart effective only during the time the said reference potential is applied to the recorder input, a switch which is continually energized for actuation of the means connecting the plurality of input sources, one at a time, to the recorder input, for automatically stopping the recording operation after a single scanning cycle of operation during which each of the plurality of input sources has been connected to the recorder input, means under control of said stopping switch for initiating recording operation of the recorder at a predetermined position of the said switch, and means under control of the said switch for terminating the recording operation when the input sources have been scanned.

References Cited in the file of this patent

UNITED STATES PATENTS

| | | |
|---|---|---|
| 1,046,346 | Teal | Dec. 3, 1912 |
| 2,663,855 | Beggs et al. | Dec. 22, 1953 |
| 2,922,686 | Cross | Jan. 26, 1960 |
| 2,995,410 | McDonell et al. | Aug. 8, 1961 |

FOREIGN PATENTS

| | | |
|---|---|---|
| 19,282 | Great Britain | 1914 |